(12) United States Patent
Biffi et al.

(10) Patent No.: US 12,315,214 B2
(45) Date of Patent: May 27, 2025

(54) OBJECT DETECTION

(71) Applicant: HUAWEI TECHNOLOGIES CO., LTD., Guangdong (CN)

(72) Inventors: Carlo Biffi, London (GB); Steven George Mcdonagh, London (GB); Ales Leonardis, London (GB); Sarah Parisot, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/902,025

(22) Filed: Sep. 2, 2022

(65) Prior Publication Data

US 2023/0115167 A1    Apr. 13, 2023

Related U.S. Application Data

(63) Continuation of application No. PCT/EP2020/055751, filed on Mar. 4, 2020.

(51) Int. Cl.
| | |
|---|---|
| *G06V 10/44* | (2022.01) |
| *G06N 20/20* | (2019.01) |
| *G06V 10/764* | (2022.01) |
| *G06V 10/771* | (2022.01) |
| *G06V 10/82* | (2022.01) |

(52) U.S. Cl.
CPC ........... *G06V 10/454* (2022.01); *G06N 20/20* (2019.01); *G06V 10/764* (2022.01); *G06V 10/771* (2022.01); *G06V 10/82* (2022.01)

(58) Field of Classification Search
None
See application file for complete search history.

(56) References Cited

FOREIGN PATENT DOCUMENTS

| | | |
|---|---|---|
| CN | 201341028 Y | 11/2009 |
| CN | 101982922 A | 3/2011 |
| CN | 109474034 A | 3/2019 |
| CN | 110224457 A | 9/2019 |
| JP | H08116604 A | 5/1996 |
| WO | 2017032254 A1 | 3/2017 |

OTHER PUBLICATIONS

EHSOD: CAM-Guided End-to-end Hybrid-Supervised Object Detection with Cascade Refinement. Fang et al. (Year: 2020).*

(Continued)

*Primary Examiner* — Delomia L Gilliard

(57) ABSTRACT

A device for categorising regions in images is disclosed. The device comprising: an input for receiving a first set of images, and defining one or more regions of for each image of the first set of images and a categorisation for the one or more regions, and a second set of images, and a categorisation for each image of the second set; and a processor configured to train a first machine learning algorithm to categorise features in images by: processing the images of the first and second set using the first algorithm to estimate feature regions in the images and a categorisation for each of the feature regions, and training the first algorithm in dependence on the categorisations received for the images of the first and second sets.

16 Claims, 5 Drawing Sheets

(56) References Cited

OTHER PUBLICATIONS

Uijlings, J.R., Van De Sande, K.E., Gevers, T., Smeulders, A.W.: Selective search for object recognition. International journal of computer vision 104(2), 154-171 (2013).
Zitnick, C.L., Dollár, P .: Edge boxes: Locating object proposals from edges. In: European conference on computer vision. pp. 391-405. Springer (2014).
Bilen, H., Vedaldi, A.: Weakly supervised deep detection networks. In: Proceedingsof the IEEE Conference on Computer Vision and Pattern Recognition. pp. 2846-2854 (2016).
Girshick, R.: Fast r-cnn. In: Proceedings of the IEEE international conference oncomputer vision. pp. 1440 1448 (2015).
Tang, Peng, et al. "Pcl: Proposal cluster learning for weakly supervised object detection." IEEE transactions on pattern analysis and machine intelligence 42.1 (2018): 176-191.
Pan, Tianxiang, et al. "Low shot box correction for weakly supervised object detection." Proceedings of the 28th International Joint Conference on Artificial Intelligence. AAAI Press, 2019.
Fang, L., Xu, H., Liu, Z., Parisot, S., Li, Z.: EHSOD: CAM-Guided End-to-EndHybrid-Supervised Object Detection with cascade refinement. In: AAAI Press 2020.
Pardo, A., Xu, M., Thabet, A., Arbelaez, P., Ghanem, B.: Baod: Budget-aware object detection. Arxiv 2019.
International Search Report and Written Opinion issued in PCT/CN2021/078659, dated Jun. 4, 2021, 9 pages.

\* cited by examiner

OBJECT DETECTION

CROSS-REFERENCE TO RELATED APPLICATIONS

This application is a continuation of International Application No. PCT/EP2020/055751, filed on Mar. 4, 2020, the disclosure of which is hereby incorporated by reference in its entirety.

FIELD OF THE INVENTION

This invention relates to object detection in images.

BACKGROUND

Object detection has witnessed significant progress in recent years by relying on large scale, manually annotated databases. Building and annotating such databases is highly time consuming and impractical in many real-life scenarios.

These drawbacks have motivated the development of weakly supervised and few-shot object detection methods. Both strategies show promise but may still underperform in comparison with their strongly supervised counterparts.

The crux of the problem can be attributed to the observation that weak training signals, provided by image-level labels or only a handful of annotated examples, do not allow learning of robust object features, often resulting in incomplete or oversized detection.

Some existing work for Weakly-Supervised Object Detection (WSOD) rely on the multiple-instance learning (MIL) framework, which aims to classify individual instances from a global, group level label. In these scenarios, each image is represented as a bag of bounding box proposals (typically extracted by traditional methods, such as that described in Uijlings, J. R., Van De Sande, K. E., Gevers, T., Smeulders, A. W.: Selective search for object recognition, International journal of computer vision 104(2), 154-171 (2013) and Zitnick, C. L., Dollar, P.: Edge boxes: Locating object proposals from edges, European conference on computer vision. pp. 391-405. Springer (2014), to be labelled by exploiting the image level labels, effectively casting weakly-supervised object detection as a multi-label classification problem, as described in Bilen, H., Vedaldi, A.: Weakly supervised deep detection networks, Proceedings of the IEEE Conference on Computer Vision and Pattern Recognition, pp. 2846-2854 (2016).

A previous line of work focused on alternating pseudo-labelling images with training a fully supervised model. Due to the computational limitations of such approaches, recent work has focused on enhancing the MIL-based labelling step, often followed by training a single fully supervised model, such as that described in Girshick, R.: Fast r-cnn, Proceedings of the IEEE international conference on computer vision. pp. 1440-1448 (2015), on the pseudo-labelled data. Proposed approaches include cascaded refinements of MIL classifications, using saliency maps, or modelling uncertainty.

Despite their potential, WSOD methods and their current evaluation suffer from some limitations. Firstly, the PASCAL VOC 2007 database has been, for a large majority of research work, the sole focus of experimental evaluations. As the dataset was designed for fully supervised detection, it lacks the diversity required to learn accurate statistics of object class appearance. Furthermore, the non-convex MIL loss function makes the optimization and the refinement strategies of WSOD models very sensitive to initialization. This leads to the development of ad-hoc training strategies and carefully hand-crafted dataset specific parameters, which substantially reduces generalizability across datasets.

Few-shot learning has recently received much attention and achieved progress. However, most previous work focusses on the classification task, rarely on other computer vision tasks, including detection. Few Shot Object Detection (FSOD) considers a fully supervised training set, and a set of novel classes comprising only K training images for each class. The objective is therefore to achieve good performance on novel classes. Recent FSOD approaches typically adapt few-shot classification techniques to the object detection setting, exploring metric learning strategies or meta-learning.

In contrast to FSOD, mixed supervision for object detection (MSOD) enhances a WSOD training set with image-level labels with a small subset of fully annotated images (e.g. K images per class as in the FSOD scenario).

Under an alternative MSOD setting, Pan, Tianxiang, et al. "Low shot box correction for weakly supervised object detection", Proceedings of the 28th International Joint Conference on Artificial Intelligence, AAAI Press, 2019 discloses a two-level approach that learns to refine the output of a pre-trained WSOD model using a small set of fully annotated images. The definition of a small set explored in their work ranges from 10 shots to 20% of the entire dataset. The approach provides a strong performance increase with respect to WSOD methods and may yield high performance in small data regimes. However, performance is highly dependent on the WSOD method serving as input to the model. BCNet learns to refine proposed detection, therefore originally missed objects can never be recovered. Finally, the method requires the training of two independent models which makes the adaption of WSOD parameters, i.e. training for new datasets, challenging.

EHSOD, as disclosed in Fang, L., Xu, H., Liu, Z., Parisot, S., Li, Z.: EHSOD: CAM-Guided End-to-End Hybrid-Supervised Object Detection with cascade refinement, AAAI Press 2020 and BAOD as disclosed in Pardo, A., Xu, M., Thabet, A., Arbelaez, P., Ghanem, B.: Baod: Budget-aware object detection, Arxiv 2019, focuses on larger data regimes (for example, 10% to 100%) and aims to reduce the data required to reach fully supervised performance using a cascaded MIL model and a teacher, student setup trained on strong and weak annotations, respectively. Such approaches tend to require more data to reach strong performance.

It is desirable to develop a device and method for object detection that overcomes these problems.

SUMMARY OF THE INVENTION

According to one aspect, there is provided a device for categorising regions in images, the device comprising: an input for receiving a first set of images, and, for each image of the first set of images, defining one or more regions of that image and a categorisation for the one or more regions, and a second set of images, and, for each image of the second set of images, a categorisation for that image; and a processor configured to train a first machine learning algorithm to categorise features in images by the steps of: processing the images of the first and second sets using the first algorithm to estimate feature regions in the images and a categorisation for each of the feature regions, and training the first algorithm in dependence on the categorisations received for the images of the first and second sets.

The processor may be configured to train the algorithm to form, for at least some of the images of the second set, an estimate of confidence of the categorisation estimated for those images. This can assist in weighting the subsequent use of those images.

The processor may be configured to train a second machine learning algorithm to categorise regions in images. The processor may be configured to use in training the second algorithm, a subset of the images of the second set as categorised by the first algorithm such that the weight of each of the images of that subset in training the second algorithm is dependent on the estimated confidence for the respective image. This can improve the training of the second algorithm.

The first algorithm may comprise a first sub-part for estimating feature regions in images and a second sub-part for estimating a categorisation for a feature region, and the processor may be configured to train the first sub-part to estimate feature regions in images of the second set which are categorised by the second sub-part to match the received categorisation for the respective image. This can assist in improving the accuracy of the first sub-part.

The second algorithm may be configured to train the second sub-part. This can improve the accuracy of the second sub-part.

The processor may be configured to train the first algorithm by taking at least some of the first and second sets of images as input to the first algorithm multiple times. This can refine the accuracy of the first algorithm.

The first algorithm may operate in dependence on a set of stored weights, and the processor may be configured to train those weights in dependence on the performance of the first algorithm in classifying the images of the first and second sets. This can allow the first algorithm to be readily trained.

The second algorithm may implement a different machine learning architecture from the first algorithm. Thus, the first algorithm may be used to help train a simpler or more complex algorithm than itself.

The second algorithm may implement less internal feedback than the first algorithm. The second algorithm may be more suitable for implementation in a device with simplified processing. The first algorithm may be helpful in reducing a need to categorise images by hand.

The first and second algorithms may comprise a common feature encoder. The device may be configured to train the first and second algorithms simultaneously in dependence on each other's performance. The first and second algorithms are end-to-end trainable. These features may assist the algorithms' training.

According to a second aspect, there is provided a method for categorising regions in images, comprising: receiving a first set of images, and for each image of the first set of images, defining one or more regions of that image and a categorisation for the one or more regions, and a second set of images, and for each image of the second set, a categorisation for that image; and training, by means of a processor, a first machine learning algorithm to categorise features in images by the steps of: processing the images of the first and second sets using the first algorithm to estimate feature regions in the images and a categorisation for each feature region, and training the first algorithm in dependence on the categorisations received for the images of the first and second sets.

The method may comprise forming, for at least some of the images of the second set, an estimate of confidence of the categorisation estimated for those images. This may allow the subsequent usage of those images to be weighted.

The method may comprise training a second machine learning algorithm to categorise regions in images, by selecting, for use in training the second algorithm, a subset of the images of the second set as categorised by the first algorithm such that the weight of each of the images of that subset in training the second algorithm is dependent on the estimated confidence for the respective image. This can improve the accuracy of training.

The method may comprise, having trained the second algorithm, implementing the second algorithm, without the first algorithm in a device for categorising features in images. In some embodiments, the second algorithm may be more suitable for implementing in a device with limited processing power.

BRIEF DESCRIPTION OF THE FIGURES

The present invention will now be described by way of examples with reference to the accompanying drawings. In the drawings.

DETAILED DESCRIPTION OF THE INVENTION

Described herein is an object detection strategy utilizing mixed supervision, which combines low-shot fully annotated examples with a large set of weakly labelled images.

In the following, I is a set of training images annotated with image-level supervision. Under the mixed supervision paradigm, a subset of these images, $S \subset I$ with $|S| \ll |I|$ is further annotated with bounding box annotations. The images contained in S are referred to as strong training images. This first set of images therefore have defined, for each image, one or more regions and a categorization for the one or more regions. The images in $W=I \backslash S$, that posses only image-level annotations, are referred to as weak training images. This second set of images therefore have defined, for each image, a categorization for that image.

Figure 1:
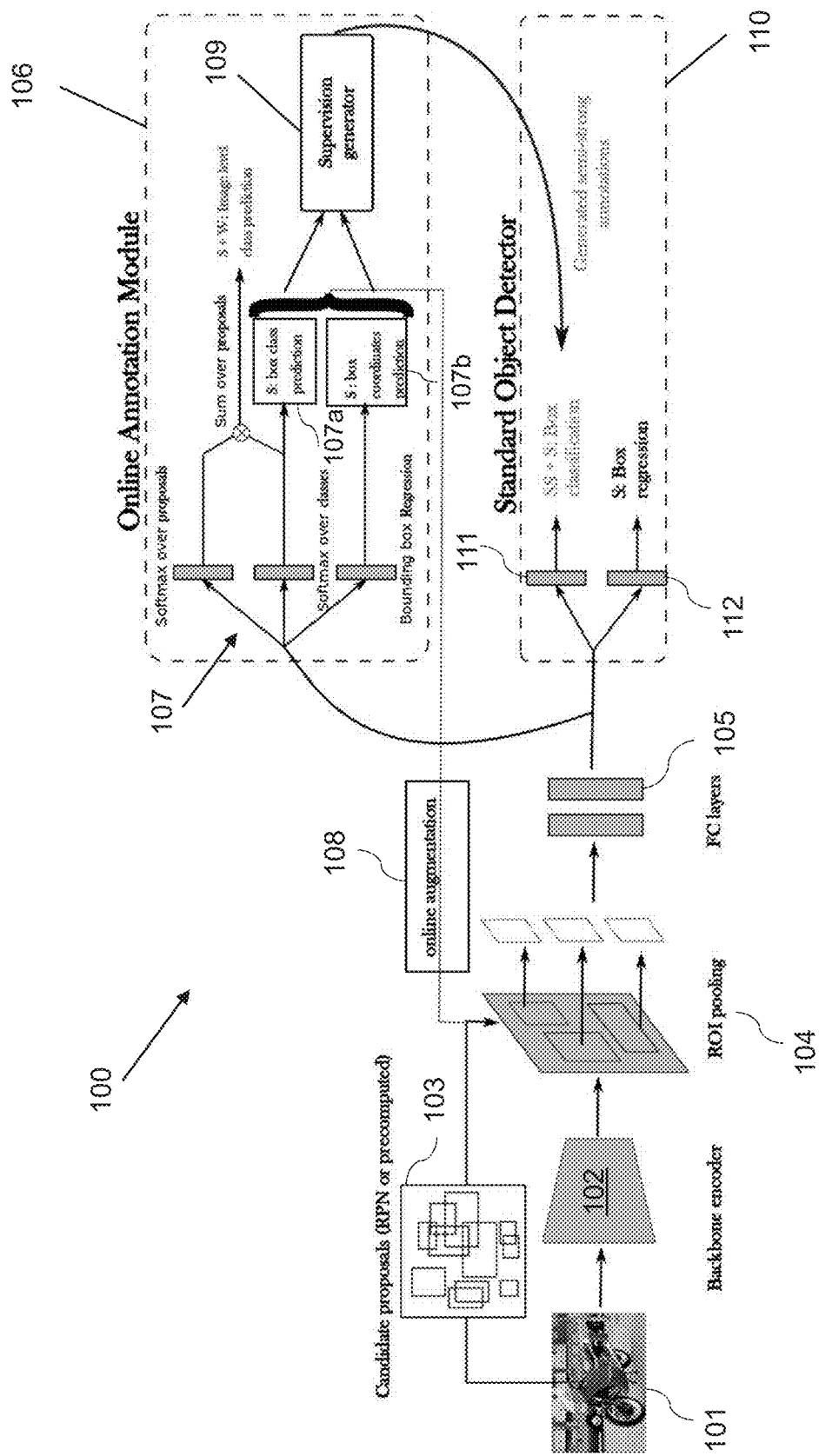
FIG. 1 schematically illustrates an example of the architecture of the proposed MSOD model.

One example of the network architecture 100 is illustrated in FIG. 1. The model comprises two branches with a shared encoder backbone.

The shared encoder backbone is indicated at 102. Shared encoder 102 processes bounding box proposal features from candidate proposals 103, which may be, for example, RPN or precomputed, for each image 101. This part of network employs an ROI pooling layer 104 to compute a fixed-length feature representation for each image bounding box proposal.

A set of B candidate proposals $\{b_r\}_{r=1}^{B}$ are first computed, using either an unsupervised method (for example, Selective Search (as described in Uijlings, J. R., Van De Sande, K. E., Gevers, T., Smeulders, A. W.: Selective search for object recognition, International journal of computer vision 104(2), 154-171 (2013)) or Edge Boxes (as described in Zitnick, C. L., Dollar, P.: Edge boxes: Locating object proposals from edges, European conference on computer vision. pp. 391-405. Springer (2014)) or a Region Proposal Network (RPN) (as described in Ren, S., He, K., Girshick, R., Sun, J.: Faster r-cnn: Towards real-time object detection with region proposal networks, Advances in neural information processing systems, pp. 91-99 (2015)), and their associated feature vectors $\{\varepsilon_r\}_{r=1}^B$. These features vectors $\{\varepsilon_r\}_{r=1}^B$ are obtained using a standard CNN backbone and ROI Pooling layer 104 and provide a common input to both of the branches: the Online Annotation Module (OAM) 106 and the fully supervised branch (standard object detector 110).

The first branch, which trains a first machine learning algorithm employs the two sets of training images: the weak set of images and the strong set of training images, to learn an Online Annotation Module (OAM) 106 of weak training images. The OAM generates bounding box annotations, with optional associated confidence scores, on-the-fly for the weak training images. Annotated weak images are added to a third set of images (i.e., this third set is a subset of the second set of 'weak' images), $P \subset W$, if they have been annotated with high confidence, and will be subsequently removed annotation confidence drops. Images contained in P are referred to as semi-strong (SS) training images herein. The second branch is designed as a standard fully supervised model and trained, at the same time, in an end-to-end manner using strong and semi-strong images.

The Online Annotation Module (OAM) 106 is designed to jointly exploit weak and strong supervision in an efficient manner. It comprises three main components: a joint detection module, shown generally at 107, which is configured to exploit weak and strong labels in a single, common architecture to predict bounding boxes and their classes, an online bounding box augmentation step 108 that generates refined bounding box proposals, and a supervision generator 109, which is configured to identify confident annotations to be used as supervision. The components will be described in more detail below.

The sets of weak 'W' and strong 'S' training images are used to train the joint detection module 107 which employs the strong training images to better differentiate partial from full object extent proposals in the MIL latent space. In addition, this module learns to annotate online weak training images and can assign an annotation confidence score to all the computed bounding box in the weak image and a global annotation score to the image.

As discussed above, these annotated weak training images constitute a third set of images, a strict subset of the weak images 'W' (second set of images), named semi-strong (SS) images. This SS set of images may expand during training to include more and more annotated weak images by the proposed joint detection module 107. The obtained strong and semi-strong sets of training images are then used to train, at the same time, the fully supervised second branch (explained in more detail below), which herein is exemplified using a fast RCNN branch.

The weak supervision component adopts the multiple instance learning (MIL) framework and comprises two parallel, fully-connected (FC) layers 105 that output two separate feature matrices $\gamma_C, \gamma_R \in \mathbb{R}^{C \times B}$ where C classes are considered.

In the joint detection module 107, by applying the softmax function along both dimensions, independently, (classes for $\gamma_C$, proposals for $\gamma_R$), two feature vectors are obtained that provide complementary information. $\gamma_C(c,l)$ represents the probability that the l-th proposal belongs to class c, while $\gamma_R(c,l)$ represents the proportional contribution that proposal l provides to the image being classified as class c. A proposal score $\phi_P = \gamma_C \odot \gamma_R$ is obtained, per class, by combining both scores using the Hadamard product $\odot$.

Summing these scores over proposals $\alpha_c = \Sigma_{r=1}^R \phi_P$, image-level supervision can be used to learn to identify relevant proposals using Op. The image-level loss function is defined using a binary cross-entropy:

$$L_{gc}(\alpha_c, y_c) = -\Sigma_{c=1}^C [(1-y_c)\log(1-\alpha_c) + y_c \log(\alpha_c)] \quad (1)$$

where $y_c$ is the label indicating the presence or absence of class c in an image. Intuitively, in some implementations, this type of MIL model may struggle to differentiate between full vs. partial object proposal extents and typically reaches convergence by assigning high scores to proposals containing highly discriminative object parts.

In contrast to the MIL task, in the second branch of the joint detection module, the strongly supervised component, comprising a standard box-level two-branch classification and regression task (performed by the part indicated at 107*a* and 107*b*), can determine accurate object representations but is highly likely to overfit to the low-shot training examples. Thus, MIL and strong components are combined via the classification task by providing direct supervision to proposal level class prediction $\gamma_C$. Enforcing synergy between the two types of supervision regularises the low-shot task, and constrains the MIL task and encoder to learn stronger discriminative features between full and partial extent object proposals.

The regression branch of the joint prediction module 107 that outputs the box coordinates predictions (107*b*) replicates the bounding box regression operation performed in traditional object detectors. Each bounding box b is parametrised as a four-tuple (x, y, h, w) that specifies its center coordinate (x,y) and its height and width (h,w). For each pre-computed proposal this last branch predicts the offset of these coordinates $t^k = (t_x, t_y, t_h, t_w)$.

Finally, the two operations are trained on strong images using the additional loss:

$$L_p(\gamma, u, t, v) = L_{cls}(\gamma, u) + \lambda[u \geq 1] L_{reg}(t, v) \quad (2)$$

where $$L_{cls} = -\frac{1}{M} \sum_{k=1}^{M} \sum_{c=1}^{C+1} u_{cr} \log(\gamma_{cr}), \quad (3)$$

$$L_{reg}(t, v) = \sum_{i \in (x,y,h,w)} smooth_{L1}(t_i - v_i)$$

Parameters $\gamma$ and u constitute the predicted and target proposal classes respectively, t and v are the predicted and target bounding box offsets respectively, and $smooth_{L1}$ is a smooth L1 loss function. Hence, the loss function on strong training images is $L_{I_s} = L_p + L_{gc}$, and the loss function on weak training images is $L_{I_w} = L_{gc}$.

The Online Bounding Box Augmentation Step performed in the OAM, shown at 108 in FIG. 1, will now be described.

Learning a strong bounding box regression block from low-shot data may be challenging, in particular, when large updates (spatial offsets) are required. In order to fully exploit the available annotations at training time, a second forward pass of the proposed branch is performed using the new bounding boxes obtained from the regression branch as input. More specifically, the top scoring M proposals are selected for each class corresponding to the image-level label obtained after the first feed-forward pass.

The coordinates of these proposals are modified accordingly using the offset $t^k$ computed by the bounding box regression branch, and these new proposals are fed to the ROI pooling layer, yielding a new set of bounding box features. The loss functions are computed on these new boxes only with new coordinates and added to the first pass losses. With the addition of this second pass, the overall loss function of the OAM branch is: $L_{1B}=L'_{I_s}+L'_{I_w}+L''_{I_s}+L''_{I_w}$, where superscripts I and II indicate first and second passes, respectively.

This second pass has a two-fold motivation. Firstly, this approach provides an intrinsic bounding box augmentation strategy, yielding a new set of proposal candidates to train the regression and classification tasks. This is particularly important in settings where pre-computed proposals are used (a predominant setting in WSOD) as, without this augmentation strategy, only a static set of input proposals (and related update transformations) will be consistently seen during training. Modifying the pre-computed proposals increases the variability of proposals, in turn enabling the learning of a regressor from more diverse inputs.

Secondly, this strategy allows exploitation of additional signals from the weak images and results in more robust performance. Indeed, any weak image proposal receiving modifications in a direction that hinders correct image-level label inference will be penalised, regularising the training process of the regressor.

A key objective of the OAM 106 is to generate reliable annotations on a large set of weakly labelled images in order to guide the training of a fully supervised second branch. As the first model in the OAM 106 is trained concurrently with the second model in the second branch 110, it is desirable to identify and add only reliable annotations to the pool of training images. The rationale is that only these images should be used to train the final supervised detection network, while images that the joint detection module struggles to annotate with high confidence should not be used for model training (for the second model), as they may hurt the training process and deteriorate detector performance.

During early stages of the training process, uncertainty regarding both the class of bounding box proposals and the related regression refinement of box coordinates may be high. As training progresses and model predictive quality improves, confidence, accuracy and stability increase. This may result in an increasingly difficult set of images being accurately annotated.

This behaviour may be exploited by introducing the supervision generator 109 that is able to identify reliably annotated images to be added to a new set of images referred to as semi-strong images set $P \subset W$, which is then used to train the second, fully supervised branch.

Figure 2:
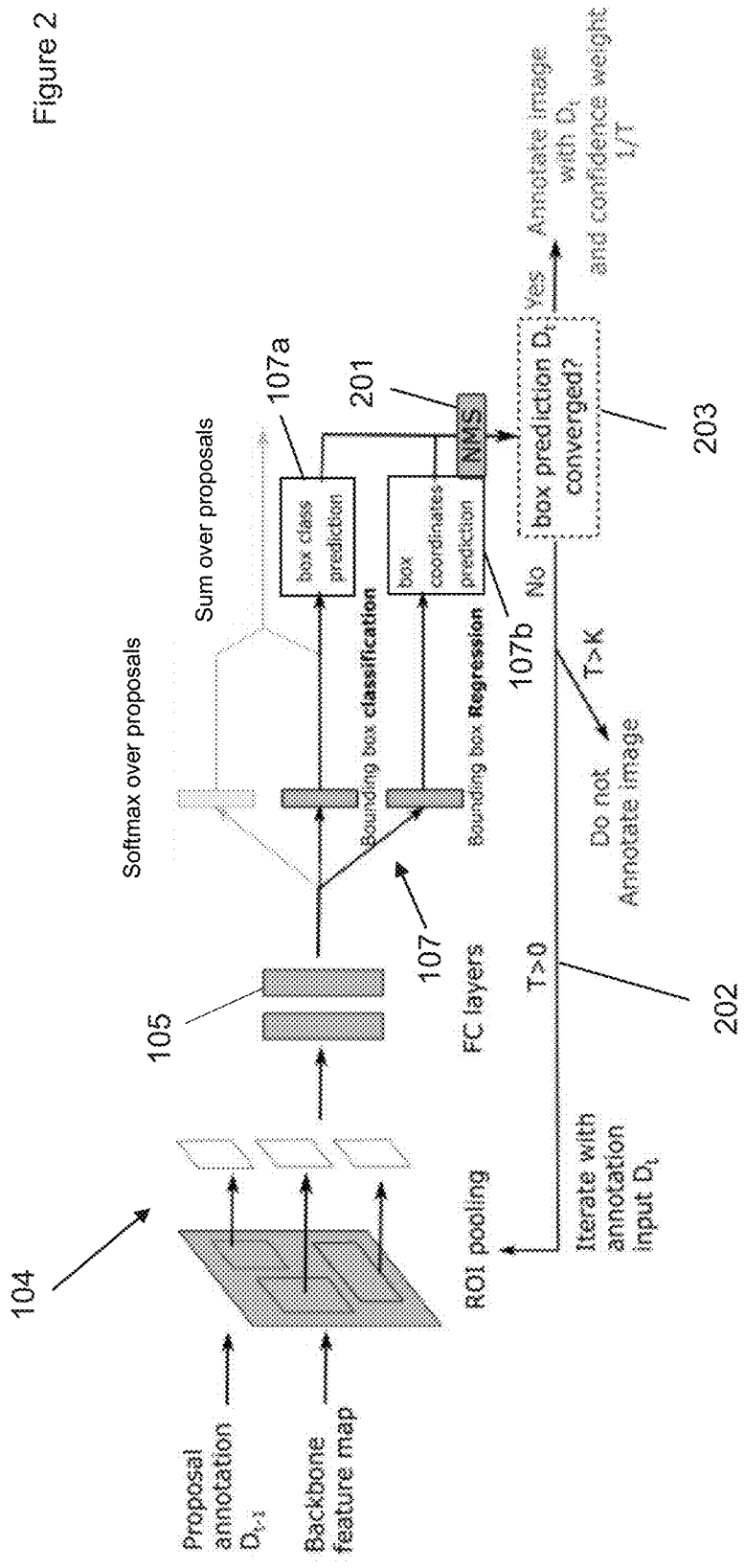
FIG. 2 schematically illustrates Online Supervision Generation.

FIG. 2 schematically illustrates the Online Supervision Generation performed by module 109 in more detail.

Intuitively, the semi-strong set of images P may comprise easy images in early stages of training (for example, single instances, uniform colour backgrounds) and diversity may progressively increase as the model becomes more accurate. In order to build a set of semi-strong images P, with bounding boxes and associated annotation confidence scores, the following mechanism may be used.

Given a weak image I, a set of $N_I$ bounding boxes $D_1=\{c_r,p_r\}_{r=1}^{N_1}$ is obtained after Non-Maximum Suppression (NMS), shown at 201, is performed on the output of the joint detection module 107, where $c_r$ and $p_r$ correspond to the class label and coordinates of box r respectively. As illustrated in FIG. 2, a strategy similar to the online augmentation step is adopted to iteratively predict a new set of $N_t$ bounding boxes $D_t=\{c_r,p_r\}_{r=1}^{N_t}$ at every iteration $t>1$, using $D_{t-1}$ as input candidate proposals. More specifically the bounding boxes $D_{t-1}$ obtained at the previous iteration are fed again to the ROI Pooling Layer 104, providing a new set of image features allowing to compute new proposal coordinates.

As illustrated by an arrow 202 in FIG. 2, the process iterates until bounding box prediction stabilises and converges (as shown at 203). The process is preferably stopped when $D_{t-1}=D_t$, i.e., when the same bounding boxes are obtained for two subsequent passes. It is estimated that convergence is achieved when, for each bounding box $b_t \in D_t$, there exists a corresponding box $b_{t-1} \in D_{t-1}$ such that $b_t$ and $b_{t-1}$ have IoU≥0.5 and possess matching class predictions (i.e. a popular criterion for characterising object equivalence in detection methods). Global confidence weight 1/T can be assigned, per image, where T steps are required to reach convergence.

The set of proposals D1 obtained at iteration 1 constitutes the final bounding box annotations. Each box is weighted (box level confidence) by its average overlap with the best matching box at all subsequent iterations. A box that is absent at a given iteration (overlap <50%) will be assigned an overlap of 0 for that iteration.

Finally, in a preferred implementation, the image may only be added to the semi-strong pool of images P if the set of obtained annotations contains all the classes of the image level label. Images with large iteration counts for convergence may be assigned low confidence scores by design and therefore have limited influence on the training procedure of the second branch. Images that do not reach convergence by K iterations, or that fail to find any foreground proposals, may not be annotated, and may not be added to the semi-strong pool P. In one example, the maximum number of updates is set as K=30, to prevent large sets of iterations, which may occur at early stages of training.

As weak images are annotated by the OAM during training, the semi-strong set of images P expands, while at the same time refining annotations and confidence as the model improves. At a given training step, a weak image that is not successfully annotated and was present in pool of semi-strong images P may be removed.

Therefore, concurrently to OAM training, the obtained strong and semi-strong sets of training images are used to train a fully supervised second branch, 110 in FIG. 1, that comprises both bounding box classification and regression modules, 111 and 112 respectively, in a similar fashion to fast RCNN type methods (see Girshick, R.: Fast R-CNN, Proceedings of the IEEE international conference on computer vision, pp. 1440-1448 (2015)).

In the second branch 110, SS images are therefore used to learn a fully supervised object detection model together with S images.

The standard object detector 110 performs classification and bounding-box regression on the proposal features $\varepsilon_{rf}$, and is trained on the strong images and the semi-strong images. In particular, at every training iteration a batch with the same number of strong and semi-strong images is used. The loss function for this branch is:

$$L_{2B}(p,u,t,v)=L_{cls}(p,u)+L_{reg}(t,v) \quad (4)$$

where p is the ROI class predictions, t is the predicted offset between ROIs and targets, u is the class label and v is the target offset. Only ROIs with foreground labels contribute to the regression loss, $L_{reg}$. The $L_{cls}$ loss constitutes a weighted cross-entropy for each image:

$$L_{cls}(p,u) = -\frac{1}{T}\sum_i w_i p_i \log(u_i) \quad (5)$$

where the proposals in each batch, contributing to the loss, are indexed by i, the confidence for GT proposal $u_i$ is denoted by $w_i$ and the image level annotation confidence score is denoted by α. Strong images are assigned image and proposal level weights of 1. In summary, collecting the introduced components, results in the overall loss function for the model: $L_{tot}=L_{1B}+L_{2B}$.

At testing, only the fully supervised object detection model is used.

Therefore, the Online Annotation Module exploits mixed supervision and can be used in conjunction with two-stage object detection methods (for example, the Fast-RCNN family) to generate accurate and confident automated annotations for concurrent fully supervised training.

Overall, the model is therefore trained on a small set of fully annotated image (images with bounding box annotation, i.e., images with one or more regions defined with a categorization for the one or more region(s)) in addition to a large set of weakly labelled images (image-level labels, i.e. images with categorizations).

The approach described herein learns to annotate weakly labelled input images on the fly, and exploits prediction stability to additionally provide associated annotation confidence scores. Then, newly annotated images with high confidence are used as confidence weighted supervision to a second, fast-RCNN style branch that shares encoding features with the OAM branch. The strategy effectively allows the training of a standard detection algorithm with only minimal annotation requirements, providing an intrinsic training curriculum, as only simple images may be labelled with high confidence at the outset.

Figure 3:
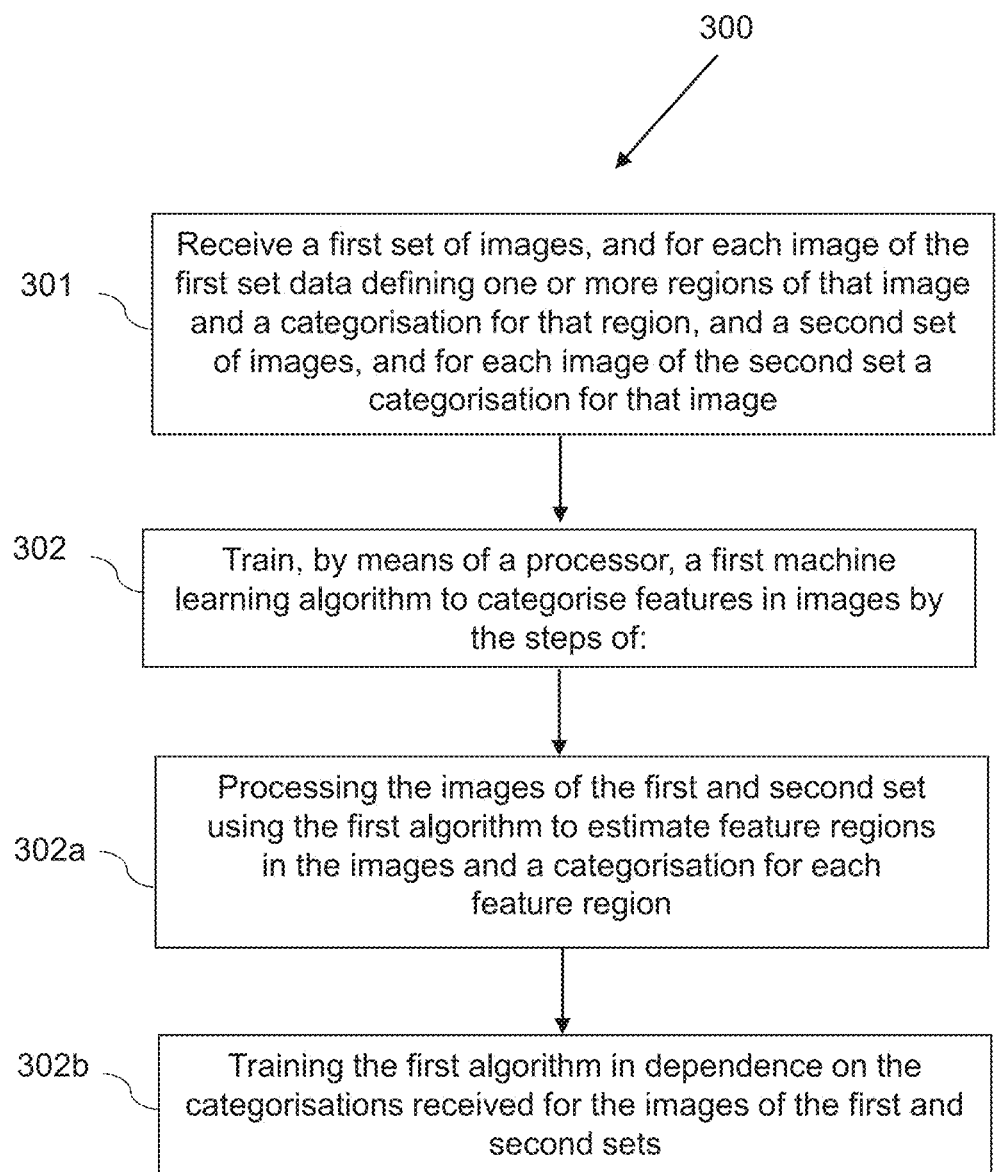
FIG. 3 shows a flowchart illustrating an example of a method of categorising regions in images.

FIG. 3 shows an example of a method for categorising features in images. At step 301, the method comprises receiving a first set of images, and for each image of the first set data defining one or more regions of that image and a categorisation for the one or more regions, and a second set of images, and for each image of the second set a categorisation for that image. At step 302, the method comprises training, by means of a processor, a first machine learning algorithm to categorise features in images by: Step 302a comprising processing the images of the first and second sets using the first algorithm to estimate feature regions in the images and a categorisation for each feature region; and Step 302b comprising training the first algorithm in dependence on the categorisations received for the images of the first and second sets.

Figure 4:
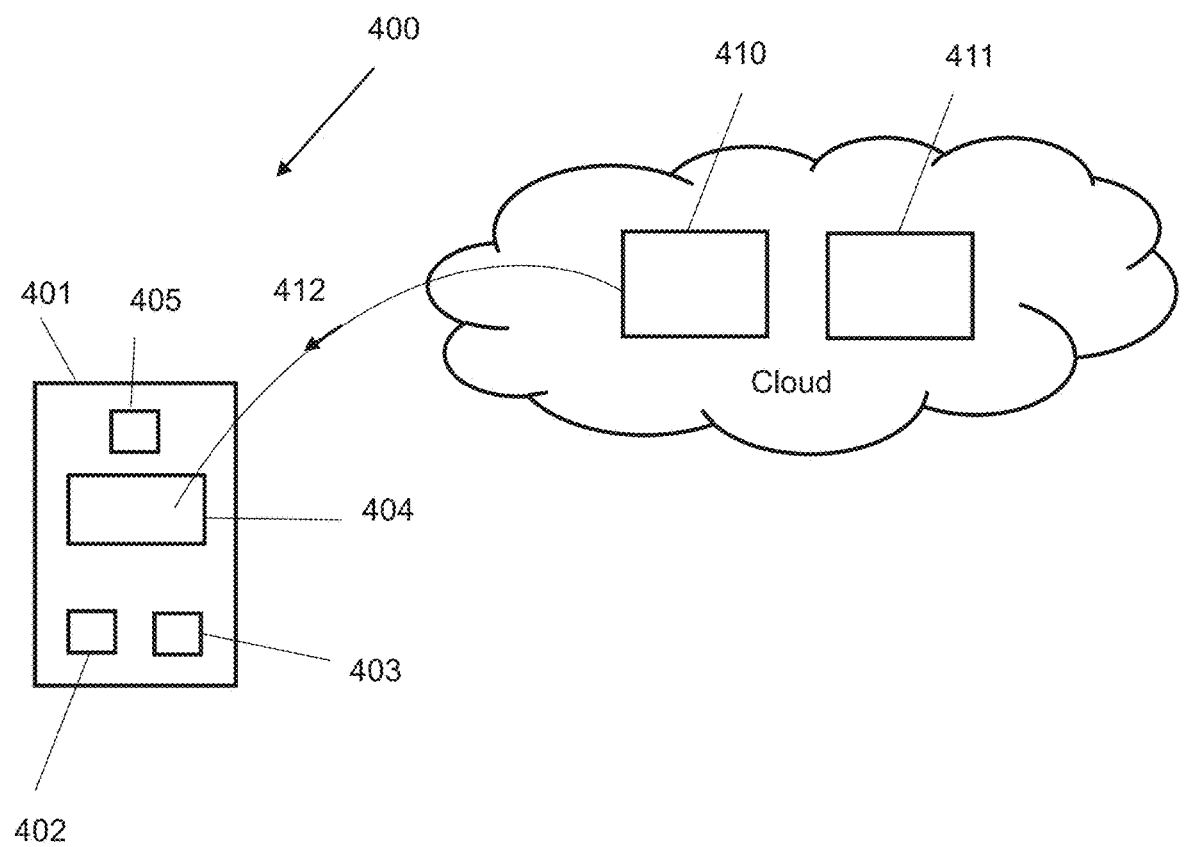
FIG. 4 shows an example of an imaging device configured to implement the device and method described herein.

FIG. 4 shows an example of a system 400 comprising a device 401 configured to use the method describe herein to process image data captured by at least one image sensor in the device. The device 401 comprises image sensors 402, 403. Such a device 401 typically includes some onboard processing capability. This could be provided by the processor 404. The processor 404 could also be used for the essential functions of the device.

The transceiver 405 is capable of communicating over a network with other entities 410, 411. Those entities may be physically remote from the device 401. The network may be a publicly accessible network such as the internet. The entities 410, 411 may be based in the cloud. Entity 410 is a computing entity. Entity 411 is a command and control entity. These entities are logical entities. In practice, they may each be provided by one or more physical devices such as servers and data stores, and the functions of two or more of the entities may be provided by a single physical device. Each physical device implementing an entity comprises a processor and a memory. The devices may also comprise a transceiver for transmitting and receiving data to and from the transceiver 405 of device 401. The memory stores in a non-transient way, code that is executable by the processor to implement the respective entity in the manner described herein.

The command and control entity 411 may train the artificial intelligence models used in the device. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical imaging device.

In one implementation, once the algorithms have been developed in the cloud, the command and control entity can automatically form a corresponding model and cause it to be transmitted to the relevant imaging device. In this example, the model is implemented at the device 401 by processor 404.

In another possible implementation, an image may be captured by one or both of the sensors 402, 403 and the image data may be sent by the transceiver 405 to the cloud for processing. The resulting image could then be sent back to the device 401, as shown at 412 in FIG. 4.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The method may also be implemented at the device, in a dedicated piece of hardware, or in the cloud.

Figure 5:
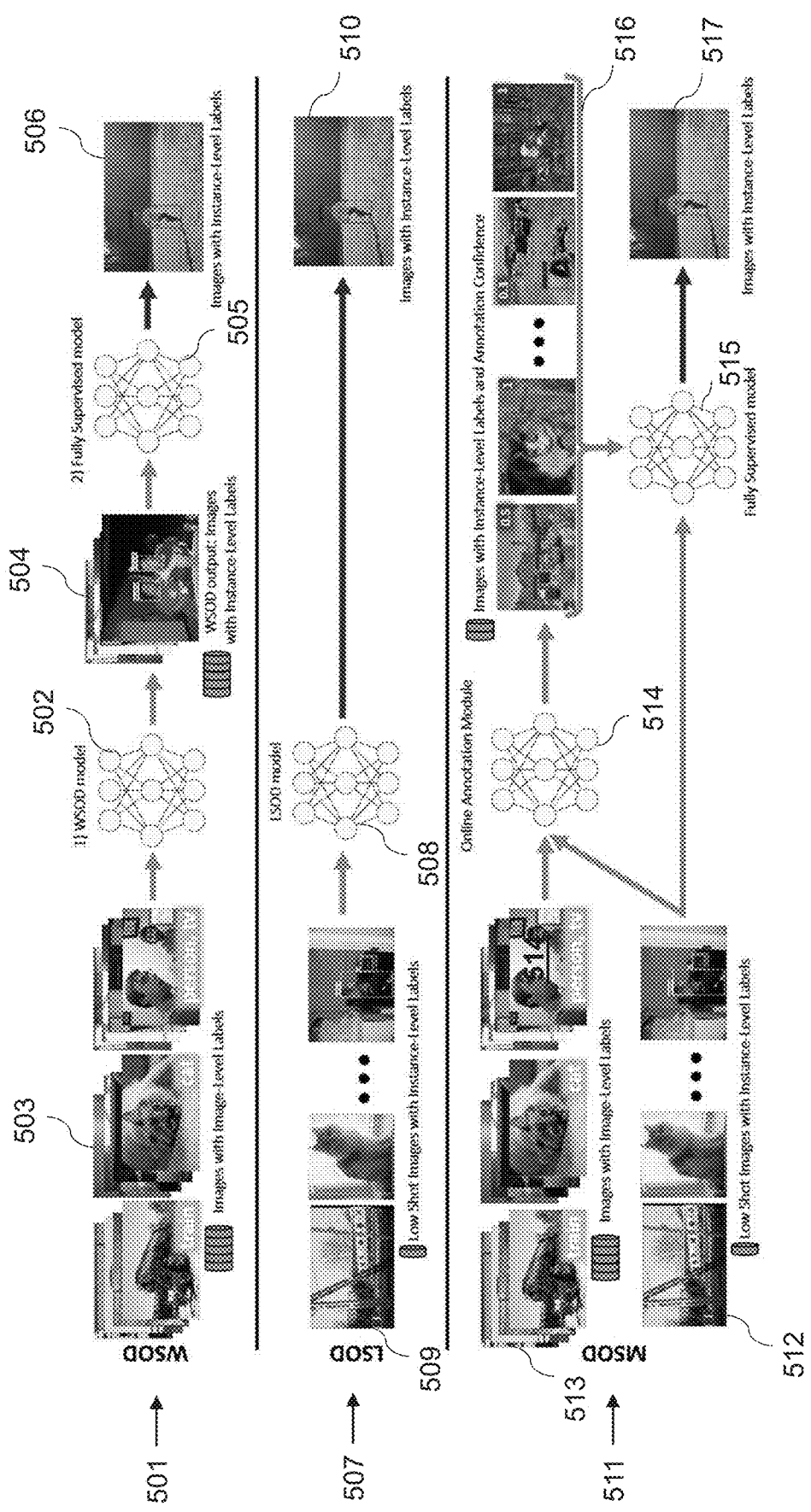
FIG. 5 schematically illustrates a comparison of low-data supervision strategies and the mixed supervision-based method described herein.

FIG. 5 shows a comparison between the different low-data supervision strategies and the mixed supervision-based setting described herein. The first row at 501 illustrates known Weakly Supervised Object Detection (WSOD) models 502 which are typically deployed to annotate images with image-level annotations 503. The WSOD output is images with instance-level labels 504 that are then used to train fully supervised models 505 to give outputs 506.

In the second row at 507, the known method of few-shot or low-shot object detection (FSOD) trains models 508 on a handful training examples. The models are trained on low-shot images with instance-level labels 509 to give output 510.

As shown in the bottom row at 511, the Mixed Supervised Object Detection (MSOD) set-up described herein combines a low shot set of images with object (instance-level) annotations 512 with a large database comprising image-level annotations 513. As described above, an Online Annotation Module 514 is trained to generate a many shots set which, at the same time, is used to train a fully supervised model 515 using online labelled images with instance-level labels and annotation confidence 516 to give output 517 (images with instance-level labels).

The MSOD approach described herein has the following advantages.

Extensive experiments on two popular benchmarks (PASCAL VOC 2007 and MS-COCO) demonstrate that in some implementations the model outperforms the low-shot state of the art, and improves performance on fully supervised counterparts by up to 10% in low-shot regimes.

The Online Annotation Module learns to generate bounding box annotations on the fly from mixed supervision. This enables high-quality training of many-shots detectors from low-shot annotations. The OAM can be combined with standard two-stage detectors and substantially improve their performance in settings with limited annotated examples.

The model is trained end-to-end, such that both the OAM and fully supervised branches share a common feature encoder and are trained in parallel, allowing both tasks to mutually regularise each other and learn a better latent space.

The approach constitutes a flexible end-to-end strategy that yields strong performance using pre-computed proposals as well as region proposal networks.

As described above, in a first branch of the network, the Online Annotation Module 106 is trained on weak and strong training images and labels weak images on the fly. Weak images annotated with high confidence are added to the pool of the semi-strong (SS) images, W images annotated with low confidence are instead removed if added before.

The Online Annotation Module therefore learns, guided by a small set of fully annotated images, to annotate a large set of weakly labelled images on the fly while at the same time providing annotation confidence. Furthermore, an online data-driven strategy which enables, at the same time, the training of the object detector in a fully-supervised fashion by exploiting the supervision generated from a modified MIL network.

As described above, a WSOD type image level classification task is combined with a fully supervised joint classification and regression task. This allows the use of low-shot fully annotated images to guide and regularise the ill-posed MIL training process, while at the same time exploiting the statistical information provided by weak images to strengthen and regularise proposal level classification and regression tasks. Compared to WSOD methods, including a small number of labelled samples yields more stable models at minimal annotation costs.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for categorizing regions in images, comprising:
    an input for receiving a first set of images, and defining one or more regions of each image of the first set of images and a categorization for the one or more regions, and a second set of images, and a categorization for each image of the second set of images; and
    a processor configured to train a first machine learning algorithm to categorize features in images by performing operations comprising:
    processing the images of the first and second sets of images using the first machine learning algorithm to estimate feature regions in the images and a categorization for each of the feature regions, and training the first machine learning algorithm in dependence on the categorizations received for the images of the first and second sets of images,
    wherein the processor is further configured to:
    train the first machine leaning algorithm to form an estimate of confidence of the categorization estimated for at least some of the images of the second set, and
    train a second machine learning algorithm to categorize regions in images by selecting, for use in training the second machine learning algorithm, a subset of the images of the second set as categorized by the first machine learning algorithm such that a weight of each of the images of that subset in training the second machine learning algorithm is dependent on an estimated confidence for the respective image.

2. The device as claimed in claim 1, wherein the processor is further configured to train the first machine learning algorithm by taking at least some of the first and second sets of images as input to the first algorithm multiple times.

3. The device as claimed in claim 1, wherein the first machine learning algorithm operates in dependence on a set of stored weights, and the processor is further configured to train those weights in dependence on the performance of the first machine learning algorithm in classifying the images of the first and second sets.

4. The device as claimed in claim 1, wherein the first machine learning algorithm comprises a first sub-part for estimating feature regions in images and a second sub-part for estimating a categorization for a feature region, and the processor is further configured to train the first sub-part to estimate feature regions in images of the second set of images which are categorized by the second sub-part to match the received categorization for the respective image.

5. The device as claimed in claim 4, wherein the second machine learning algorithm is configured to train the second sub-part.

6. A method for categorizing regions in images, comprising:
    receiving a first set of images, and defining one or more regions of each image of the first set of images and a categorization for the one or more regions, and a second set of images, and a categorization for each image of the second set of images;
    training, by a processor, a first machine learning algorithm to categorize features in images by performing operations comprising:
    processing the images of the first and second sets of images using the first machine learning algorithm to estimate feature regions in the images and a categorization for each of the feature regions, and training the first machine learning algorithm in dependence on the categorizations received for the images of the first and second sets of images;
    forming, for at least some of the images of the second set, an estimate of confidence of the categorization estimated for those images; and
    training a second machine learning algorithm to categorize regions in images, by selecting, for use in training the second machine learning algorithm, a subset of the images of the second set of images as categorized by the first machine learning algorithm such that a weight of each of the images of that subset in training the second machine learning algorithm is dependent on an estimated confidence for the respective image.

7. The device as claimed in claim 1, wherein the second machine learning algorithm implements a machine learning architecture different from the first machine learning algorithm.

8. The device as claimed in claim 1, wherein the second machine learning algorithm implements less internal feedback than the first machine learning algorithm.

9. The device as claimed in claim 1, wherein the first and second machine learning algorithms comprise a common feature encoder.

10. The device as claimed in claim 1, the device being configured to train the first and second machine learning algorithms simultaneously in dependence on each other's performance.

11. The device as claimed in claim 1, wherein the first and second machine learning algorithms are end-to-end trainable.

12. The method as claimed in claim 6, further comprising, after training the second machine learning algorithm, implementing the second machine learning algorithm, without the first machine learning algorithm in a device for categorizing features in images.

13. The method as claimed in claim 12, wherein the first machine learning algorithm comprises a first sub-part for estimating feature regions in images and a second sub-part for estimating a categorization for a feature region, and the method further comprises training the first sub-part to estimate feature regions in images of the second set of images which are categorized by the second sub-part to match the received categorization for the respective image.

14. The method as claimed in claim 13, wherein the second machine learning algorithm is configured to train the second sub-part.

15. The method as claimed in claim 12, further comprising training the first machine learning algorithm by taking at least some of the first and second sets of images as input to the first algorithm multiple times.

16. The method as claimed in claim 12, wherein the first machine learning algorithm operates in dependence on a set of stored weights, and the method further comprises training those weights in dependence on the performance of the first machine learning algorithm in classifying the images of the first and second sets.

* * * * *